Figure 1:
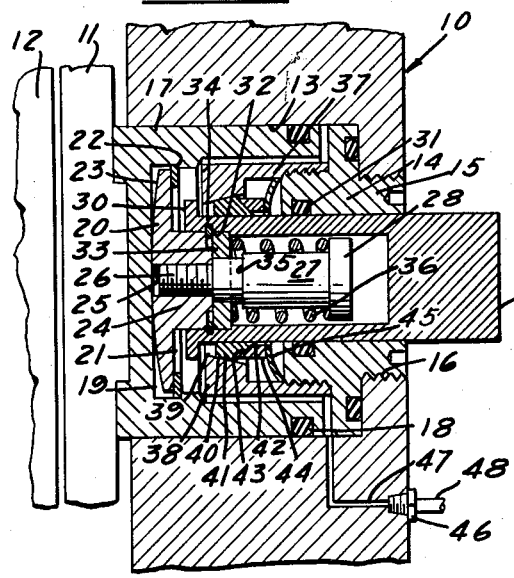

Dec. 24, 1963  T. T. CAGLE  3,115,220

VEHICLE BRAKING MECHANISM

Original Filed June 15, 1955

INVENTOR.
Toby T. Cagle,
BY
Robert McKee Manigal
Attorney

United States Patent Office 3,115,220
Patented Dec. 24, 1963

3,115,220
VEHICLE BRAKING MECHANISM
Toby T. Cagle, Bellflower, Calif., assignor to Airheart Products, Inc., Long Beach, Calif., a corporation of California
Original application June 15, 1955, Ser. No. 515,590, now Patent No. 2,905,277, dated Sept. 22, 1959. Divided and this application Dec. 24, 1957, Ser. No. 711,538
5 Claims. (Cl. 188—196)

The present invention relates generally to brakes for wheeled vehicles, and is more particularly concerned with means for automatically compensating for brake wear, and for adjusting brake release clearance.

The present invention constitutes a division of my co-pending application, Serial No. 515,590, filed June 15, 1955, now Patent No. 2,905,277.

It is one object of the present invention to provide means to automatically adjust the brake release clearance so as to compensate for changes in the clearance due to thermal expansion, installation of new braking elements, and other factors inherent in vehicle brake structures.

A further object of the invention is to provide a unique structure in a vehicle brake, which combines the brake release clearance compensation feature with improved means for automatically indicating and compensating for brake wear.

Another object is to provide improved fluid actuated means for automatically adjusting the brake release clearance each time the brake is used, and whereby uniform operation of the master cylinder by the brake pedal will result.

Briefly the present invention comprises power means for actuating the brake elements, the power means comprising a cylinder within which there is mounted a main piston, an auxiliary piston, and a fixed member. A unique connection means is provided between the main piston and the fixed member, which are so arranged that during normal operation the main piston is confined to reciprocable movement between predetermined limits which constitute the brake clearance space when the brake is in released position. In addition to the limited movement of the main piston, a holding device is incorporated in the connection which is arranged to release the main piston for movement beyond the predetermined limits when a predetermined holding force of the device is exceeded. With this arrangement, the braking elements are actuated within the predetermined limits or clearance space until such time as the brake wear becomes so great that the brake will not set up tightly within the predetermined limits of movement. Under such conditions, the actuating pressure applied to the main piston causes relative movement beyond the predetermined limits as a result of exerting a force which is greater than the opposing force of the holding device. Upon release of the brake, the piston is withdrawn by return spring means which is operative within the predetermined limits of movement of the main piston.

Further objects of the invention will be brought out in the following part of the specification, wherein detailed description is for the purpose of fully disclosing the invention without placing limitations thereon.

Figure 2:
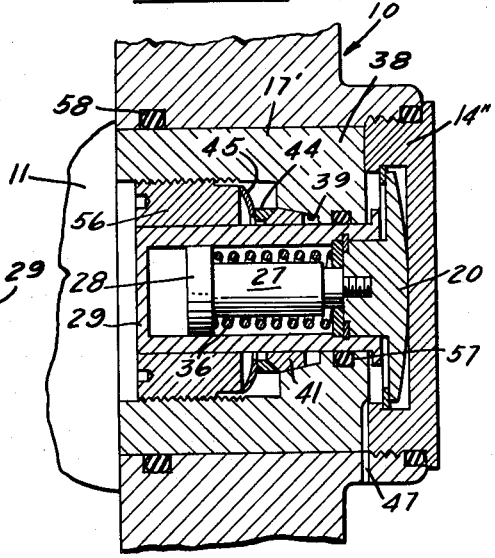
Figure 3:
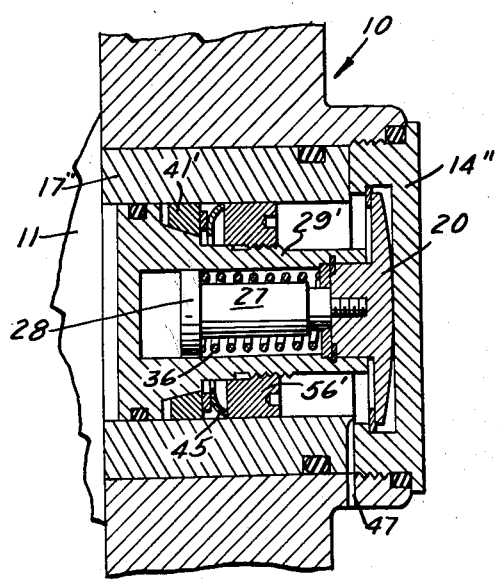
Figure 4:
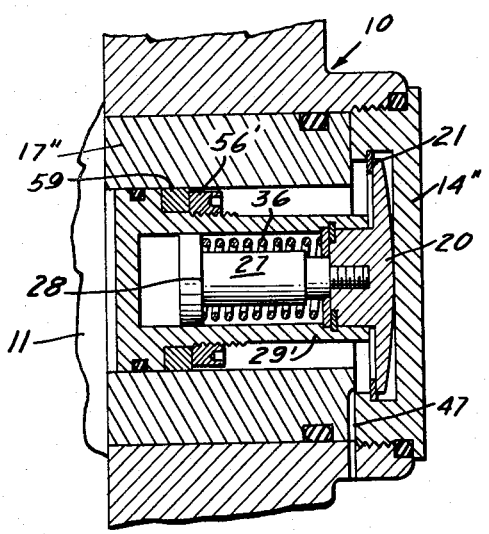

Referring to the accompanying drawings, which are for illustrative purposes only:

FIG. 1 is a diametral section taken through a brake operating mechanism embodying the features of the present invention, certain of the parts being shown in elevation for clearness; and FIGS. 2, 3, and 4 are similar views respectively showing modified structures embodying the invention.

Referring generally to the accompanying drawings, for illustrative purposes, the present invention is shown as embodying a body structure, as generally indicated by the numeral 10, which houses the brake actuating mechanism for moving an associated brake shoe 11 into and out of engagement with a brake drum 12 or other conventional braking element as may be associated with the vehicle wheel, and against which the braking forces are adapted to be applied.

The body structure 10 is formed with a cylindrical bore 13 which forms a cylinder of the operating mechanism for the brakes. This cylindrical bore is open at one end, and is closed at the opposite end by means of a head bushing 14 having an outer end 15 adapted to threadedly engage a wall opening 16 formed at this end of the cylindrical bore.

Within the cylindrical bore 13, there is positioned a main piston 17 of cup-shaped construction, this piston having its inner portion arranged to engage with the brake shoe 11, and being provided on its peripheral surface with a recessed O-ring 18 adapted to make sealing engagement with the cylinder wall.

Internally, the main piston has a circumferentially extending groove 19 adjacent the inner portion of the piston. This groove is adapted to receive therein the periphery of a disc member 20, the disc member being retained by means of a snap ring 21 which abuts a shoulder 22 of the retaining groove. The disc member 20 is provided with a curved surface 23 on the face thereof which is in confronting relation with the adjacent inner wall of the main piston, so that the disc member and the piston may have slight relative and rocking movements.

The disc member 20 is centrally provided with a hub portion 24 which is centrally provided with a bore 25 adapted to connectedly receive a threaded end 26 of an axially extending stud bolt 27 formed at its outer end with a head portion 28.

There is also mounted in the cylinder bore 13 an auxiliary piston 29 which is also of cup-shaped construction, this auxiliary piston having its outer end closed and its inner end open and formed with a radially projecting rim flange 30. The auxiliary piston is supported for reciprocable axial movement within the head bushing 14, this bushing having a recessed O-ring 31 for making sealing engagement with the outer surface of the auxiliary piston.

As thus mounted, the stud bolt 27 extends into the interior of the auxiliary piston through its inner open end, and the auxiliary piston is connected with this stud bolt so as to provide limited relative movement, as will now be explained. Adjacent the inner open end of the auxiliary piston, the inner wall thereof is provided with a circumferentially extending groove 32 which forms a seat for a stop member in the form of a collar member 33 which is held in seated position by means of a snap ring 34 in a suitable groove in the auxiliary piston wall, so that the collar 33 will be moved with the auxiliary piston during its reciprocable movements.

The inner periphery of the collar 33 surrounds a contracted portion of the stud bolt 27, which permits relative inward and outward movement of the collar between predetermined limit positions as established by the outwardly facing abutment formed by the adjacent end of the hub portion 24 on one side of the collar and the inwardly facing abutment formed by a shoulder 35 on the other side of the collar. A compression coil spring 36 surrounds the stud bolt 27 and has one end bearing against its head portion 28 and its other end bearing against the collar 33, this spring normally acting to bias the main piston 17 in a direction which will move the brake shoe to released or nonbraking position, the collar 33 in the nonbraking position being as shown in abutment with the adjacent hub portion 24.

In addition to the connection just described which permits limited relative movement between the stud bolt 27 and the auxiliary piston, a holding device is also provided for normally holding the auxiliary piston against bodily movement, except when there is a tendency to exceed the limited movement of the main piston as established by the movement of the collar 33, as just described above.

The holding device is shown as being positioned within a tubular projection 37 which is secured at one end to the head bushing 14 and concentrically surrounds the auxiliary piston. As shown, the other end of the tubular projection 37 is constructed with an inturned end flange 38 which carries on its inner periphery a bevelled surface 39 which engages with a coacting surface 40 formed on a grip ring 41 having wedging relation with the auxiliary piston.

The grip ring 41 is also provided with a second bevelled or inclined surface 42, this surface being inclined at a different angle than the surface 40, and being arranged to coact with a bevelled surface 43 formed upon a ring member 44. The ring member 44 is spring loaded by means of a Belleville spring 45 which biases the ring 44 and grip member 41 inwardly or to the left as viewed in FIG. 1. By inclining the surface 40 and the surface 42 of the grip member at different angles, it is possible to regulate the frictional pressure which will be applied in one direction of the movement of the auxiliary piston and obtain a different frictional pressure in an opposite direction of movement of the auxiliary piston. As shown, the inclined surfaces are so chosen that a greater frictional pressure will oppose movement of the auxiliary piston inwardly, than the pressure which opposes movement of the auxiliary piston in an outward direction.

Provision is made for supplying an operating fluid through a passage 47 into the cylinder for operating the pistons and actuating the braking elements. The passage 47 is brought out to a connection fitting 46, this fitting being adapted for terminal connection with a conduit 48 through which actuating fluid may be supplied from a suitable source.

The operation of the brake mechanism as thus far described will now be briefly explained. Referring to FIG. 1, the brake shoe 11 is shown as being in nonbraking position wherein it is spaced from the brake element 12, this spacing constituting the brake released clearance which is determined by the clearance space existing between the shoulder 35 on the stud bolt 27 and the adjacent face of the collar 33. So long as this clearance is not exceeded, the main piston will be moved in a brake setting direction when operating fluid is supplied to the cylinder. Upon release of the fluid pressure, the main piston is moved in the opposite or released direction by the action of the spring 36. During this operation there will be no movement of the auxiliary piston 29.

Let it now be considered that the brake shoe has been worn sufficiently that there will not be enough clearance between the shoulder 35 and the collar 33 to permit the brake shoe to effectively engage the braking element 12 when operating fluid is admitted into the cylinder. Under such circumstances, the main piston will be moved within the limits of its movement, until the shoulder 35 engages the collar 33. Up to this point, the holding device will frictionally oppose movement of the auxiliary piston 29. However, as soon as the shoulder 35 strikes the collar 33, the main piston will act to apply pulling force against the auxiliary piston, and as soon as this pulling force exceeds the frictional force or drag on the auxiliary piston by virtue of the holding device, the auxiliary piston will be moved in unison with the main piston and full braking effect obtained against the braking element 12. Thus the auxiliary piston will be moved inwardly so as to compensate for the wear on the brake shoe, and the position of the auxiliary piston as viewed from its projecting exposed outer end will serve as a visual indicator of the amount of wear on the brake shoe.

When the pressure of the fluid within the piston is released, the spring 36 will act in the same manner as before to withdraw the brake shoe a distance corresponding with the built-in clearance as established by the space between the shoulder 35 and the adjacent face of the collar 33.

The operations just described are the usual normal operating conditions. However, a different operating condition may prevail where, for example, the brake shoe 11 is in engagement with the braking element 12, when the main piston is in brake releasing position. Such a condition may exist in the event that a new braking shoe has been installed. When fluid pressure is applied within the cylinder, this pressure cannot cause movement of the main piston because the brake shoe is already against the braking element 12. It will be apparent that if the brake shoe clearance is not readjusted, the brake shoe can not move away from the braking element 12 when the actuating pressure is released. Thus under such circumstances, when the actuating pressure is applied to the cylinder, and since the main piston can not move in a brake setting direction, this pressure will act to move the auxiliary piston outwardly until the collar 33 engages the shoulder 35 of the stud bolt. During this movement, the holding device opposes the movement of the auxiliary piston with less frictional force than opposes movement of the auxiliary piston in the opposite direction. Thus the built-in clearance is automatically reestablished.

The arrangements shown in FIGS. 2 to 4 inclusive of the drawings are modifications in which the physical structures have been somewhat modified, but which include the basic principles of operation inherent in the devices embodying the present invention. In the modified structures, similar numerals have been utilized to indicate the various elements which correspond to those which are embodied in the arrangement described and shown in FIG. 1.

Referring now to the modifications shown in FIGS. 2, 3 and 4, these arrangements in a broad sense operate in the same manner as the arrangement of FIG. 1, except that in these modifications, the limited movement is accomplished between a fixed structure and the auxiliary piston, and the holding device is positioned between the auxiliary piston and the main piston.

As more specifically shown in FIG. 2, the head bushing 14 is modified to provide an end closure cap or plug 14″ to which the disc member 20 is similarly secured by a structure corresponding at that in which it was secured to the main piston in FIG. 1. Moreover, it will be observed that the installed position of the auxiliary piston is in this case reversed from that previously utilized and that the action of the fluid pressure in the cylinder is in this case such as to move the auxiliary and main pistons in the same direction within the limits of movement as established for release clearance. In this case, the holding device being positioned between the main piston and auxiliary piston, necessitates a slight change in construction of the main piston. The modified main piston 17′ is in this case internally threaded to receive a bushing 56 which has sliding engagement with the exterior of the auxiliary piston 29. This bushing also serves to adjust the grip ring 41, the ring member 44 and spring 45, which act in the same manner as in the FIG. 1 structure, except that the loading is adjustable in this case.

It will also be noted that the bevelled surface 39 is in this case formed on the interior of the main piston 17′ instead of being formed on the tubular projection 37. A sealing ring 57 is carried in this case by the main piston and makes sealing engagement with the auxiliary piston. Moreover the main piston 17′ is sealed by a sealing ring 58, in this case mounted in the body structure 10.

The arrangement shown in FIG. 3 is basically the same as that shown in FIG. 2, except that in this case the auxiliary piston 29′ carries the bushing 56′, and instead of utilizing a grip ring, an expansion ring 41′ is used, this expansion ring being loaded by the spring 45 so that it exerts an outward pressure against the interior of the main piston 17″ in this case.

Referring now to the structure shown in FIG. 4, this structure is quite similar to that shown in FIG. 3, except that instead of utilizing a loading spring 45 as in the previous arrangements, an expansion spring ring 59 is utilized, this spring ring having inherent spring characteristics such that a predetermined friction is exerted outwardly against the interior of the main piston during relative movement therebetween in opposite directions.

It is believed that the operation of the modified structures will be readily apparent to those skilled in the art, and that further description of the operation will be unnecessary.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. Brake actuating mechanism for actuating cooperable braking elements mounted for relative movement into and out of engagement and for establishing and maintaining a predetermined clearance between such braking elements, said mechanism comprising a body structure containing a cylinder, a main piston movable in an inward direction in said cylinder for moving one of the braking elements in brake-applying direction, an auxiliary piston movable axially of said main piston and having lesser effective area than said main piston, stop means carried by said body structure including axially spaced first and second abutments fixed relative to both of said pistons and a stop member fixed relative to one of said pistons between said first and second abutments to positively limit the extent of inward movement of said one of said pistons to a fixed distance corresponding to a desired predetermined brake clearance, a holding device fixed relative to the other of said pistons and engaging said one of said pistons with a holding action to normally prevent relative movement of said pistons, spring means urging said pistons outwardly to a brake-releasing position in which said stop member engages said first abutment to establish the predetermined clearance, means for applying fluid pressure to said cylinders to move them inwardly in brake-applying direction, said main piston overcoming the holding action of said holding device and moving relative to said auxiliary piston in the brake-applying inward direction thereof when the brake clearance is such that said stop member engages said second abutment prior to application of the brake, and, when the brake clearance is below the predetermined value, the fluid pressure within said cylinder moving said auxiliary piston in the inward direction against the holding action of said holding device until said stop member engages said second abutment.

2. Brake actuating mechanism as defined in claim 1 in which said holding device has a greater holding action when the main piston is moved inwardly and the auxiliary piston is stationary, than when the main piston is stationary and the auxiliary piston moves inwardly.

3. Braking actuating mechanism for actuating cooperable braking elements mounted for relative movement into and out of engagement and for establishing and maintaining a predetermined clearance between such elements, said mechanism comprising a body structure containing a cylinder, a main piston movable in an inward direction in said cylinder for moving one of the braking elements in brake-applying direction, an auxiliary piston movable axially of said main piston and having lesser effective area than said main piston, stop means carried by said body structure including axially spaced first and second abutments fixed relative to both of said pistons and a stop member movable with said auxiliary piston between said first and second abutments to positively limit the extent of inward movement of said auxiliary piston to a fixed distance corresponding to a desired predetermined brake clearance, a holding device carried by said main piston and engaging said auxiliary piston with a holding action to normally prevent relative movement of said pistons, spring means urging said pistons outwardly to a brake-releasing position in which said stop member engages said first abutment to establish the predetermined clearance, means for applying fluid pressure to said cylinders to move them inwardly in brake-applying direction, said main piston overcoming the holding action of said holding device and moving relative to said auxiliary piston in the brake-applying inward direction thereof when the brake clearance is such that said stop member engages said second abutment prior to application of the brake, and, when the brake clearance is below the predetermined value, the fluid pressure within said cylinder moving said auxiliary piston in the inward direction against the holding action of said holding device until said stop member engages said second abutment.

4. Braking actuating mechanism for actuating cooperable braking elements mounted for relative movement into and out of engagement and for establishing and maintaining a predetermined clearance between such braking elements, said mechanism comprising a body structure containing a cylinder, a main piston movable in an inward direction in said cylinder for moving one of the braking elements in brake-applying direction, an auxiliary piston movable axially of said main piston and having lesser effective area than said main piston, stop means carried by said body structure including axially spaced first and second abutments fixed relative to both of said pistons and a stop member movable with said auxiliary piston between said first and second abutments to positively limit the extent of inward movement of said auxiliary piston to a fixed distance corresponding to a desired predetermined brake clearance, a holding device carried by said auxiliary piston and engaging said main piston with a holding action to normally prevent relative movement of said pistons, spring means urging said pistons outwardly to a brake-releasing position in which said stop member engages said first abutment to establish the predetermined clearance, means for applying fluid pressure to said cylinders to move them inwardly in brake-applying direction, said main piston overcoming the holding action of said holding device and moving relative to said auxiliary piston in the brake-applying inward direction thereof when the brake clearance is such that said stop member engages said second abutment prior to application of the brake, and, when the brake clearance is below the predetermined value, the fluid pressure within said cylinder moving said auxiliary piston in the inward direction against the holding action of said holding device until said stop member engages said second abutment.

5. Brake actuating mechanism as defined in claim 4 in which said holding device has a greater holding action when the main piston is moved inwardly and the auxiliary piston is stationary, than when the main piston is stationary and the auxiliary piston moves inwardly.

References Cited in the file of this patent

UNITED STATES PATENTS

| 2,160,055 | Brace | May 30, 1939 |
| 2,536,269 | Driscoll | Jan. 2, 1951 |
| 2,551,251 | Du Bois | May 1, 1951 |
| 2,619,198 | Freund | Nov. 25, 1952 |
| 2,644,549 | Cagle | July 7, 1953 |
| 2,746,254 | Lucien | May 22, 1956 |